US012807411B2

(12) United States Patent
Kitamura

(10) Patent No.: US 12,807,411 B2
(45) Date of Patent: Nov. 24, 2026

(54) TRANSPORT SYSTEM

(71) Applicant: Murata Machinery, Ltd., Kyoto (JP)

(72) Inventor: Wataru Kitamura, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 222 days.

(21) Appl. No.: 18/848,632

(22) PCT Filed: Feb. 24, 2023

(86) PCT No.: PCT/JP2023/006674
§ 371 (c)(1),
(2) Date: Sep. 19, 2024

(87) PCT Pub. No.: WO2023/189069
PCT Pub. Date: Oct. 5, 2023

(65) Prior Publication Data

US 2025/0206532 A1 Jun. 26, 2025

(30) Foreign Application Priority Data

Mar. 29, 2022 (JP) ................................ 2022-052935

(51) Int. Cl.
*B65G 1/137* (2006.01)
*B65G 1/04* (2006.01)

(52) U.S. Cl.
CPC .......... *B65G 1/137* (2013.01); *B65G 1/0457* (2013.01); *B65G 2201/0235* (2013.01)

(58) Field of Classification Search
CPC .................. B65G 1/137; B65G 1/0457; B65G 2201/0235; B65G 1/00; B65G 1/1378;
(Continued)

(56) References Cited

U.S. PATENT DOCUMENTS

2012/0004767 A1 1/2012 Tominaga
2017/0229333 A1 8/2017 Kinugawa et al.
2022/0073277 A1 3/2022 Ueda et al.

FOREIGN PATENT DOCUMENTS

JP H10312426 A 11/1998
JP 201388987 A * 5/2013
JP 2013088987 A 5/2013

OTHER PUBLICATIONS

Official Communication issued in corresponding Singaporean Patent Application No. 11202406630U, mailed on Dec. 30, 2025, 6 pages.

(Continued)

*Primary Examiner* — Long T Tran
*Assistant Examiner* — Charles J Brauch
(74) *Attorney, Agent, or Firm* — Keating & Bennett, LLP

(57) ABSTRACT

A transport system includes a controller and a transport vehicle to transport an article along a track. The controller is configured or programmed to control the transport vehicle. A destination of the transport vehicle includes a processing position and a storage position. The controller is configured or programmed to perform a pre-processing and a route shut down processing when shutting down a target route. The pre-processing includes at least one of a process: (1) to allow only some of the transport vehicles to pass through the target route, (2) to evacuate the article located in a closed area to an effective area using the transport vehicle, or (3) to permit a transport destined for the processing position in the closed area and prohibit a transport destined for the storage position in the closed area. Route shut down processing is performed after the pre-processing and prohibits the transport vehicle from traveling the target route.

4 Claims, 5 Drawing Sheets

(58) Field of Classification Search
CPC .......... B65G 49/061; B65G 2201/0297; H10P 72/3216; H10P 72/3218; H10P 72/3221; H10P 72/3404
See application file for complete search history.

(56) References Cited

OTHER PUBLICATIONS

International Search Report in PCT/JP2023/006674, mailed May 16, 2023, 2 pages.

* cited by examiner

FIG. 5

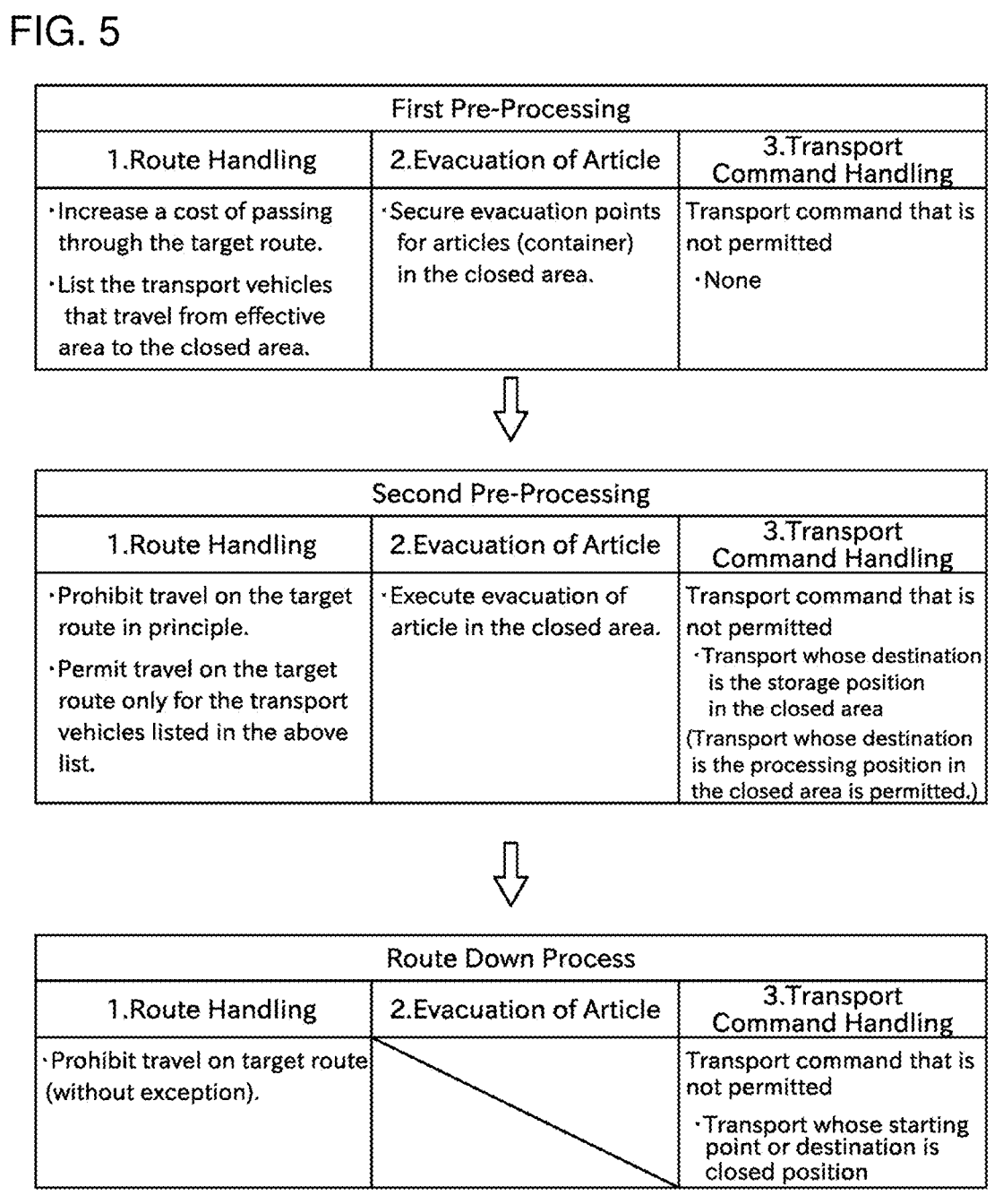

| First Pre-Processing | | |
|---|---|---|
| 1.Route Handling | 2.Evacuation of Article | 3.Transport Command Handling |
| ・Increase a cost of passing through the target route.<br>・List the transport vehicles that travel from effective area to the closed area. | ・Secure evacuation points for articles (container) in the closed area. | Transport command that is not permitted<br>・None |

⇩

| Second Pre-Processing | | |
|---|---|---|
| 1.Route Handling | 2.Evacuation of Article | 3.Transport Command Handling |
| ・Prohibit travel on the target route in principle.<br>・Permit travel on the target route only for the transport vehicles listed in the above list. | ・Execute evacuation of article in the closed area. | Transport command that is not permitted<br>・Transport whose destination is the storage position in the closed area<br>(Transport whose destination is the processing position in the closed area is permitted.) |

⇩

| Route Down Process | | |
|---|---|---|
| 1.Route Handling | 2.Evacuation of Article | 3.Transport Command Handling |
| ・Prohibit travel on target route (without exception). | | Transport command that is not permitted<br>・Transport whose starting point or destination is closed position |

TRANSPORT SYSTEM

BACKGROUND OF THE INVENTION

1. Field of the Invention

The present invention relates primarily to transport systems to transport articles via transport vehicles.

2. Description of the Related Art

The transport system of International Publication No. WO2010/100834 includes a travel path, a transport vehicle traveling along the travel path, and a controller controlling the transport vehicle.

The controller can perform a route shut down process for a portion of the travel path.

The controller controls the transport vehicle so that the transport vehicle does not pass through the travel path that has been shut down.

SUMMARY OF THE INVENTION

When a route shut down process is executed, various processes are required to be performed along with the route shut down process. For example, it may be necessary to change the route of the transport vehicle. In addition, it may also be necessary to shut down the transport port associated with the travel route that has been shut down. Therefore, the processing load of the controller increases when the route shut down process is being executed.

Example embodiments of the present invention provide transport systems that each reduce or minimize a processing load of a controller when executing a route shut down process.

According to an example embodiment of the present invention, a transport system includes a transport vehicle and a controller. The transport vehicle is operable to transport an article by traveling along a track. The controller is configured or programmed to control the transport vehicle. A destination of the transport vehicle includes a processing position, which is a position to deliver the article to a processor, and a storage position, which is a position to temporarily store the article. The controller is configured or programmed to execute a pre-processing and a route shut down process when shutting down a target route, which is a route selected from a plurality of routes on the track. The pre-processing includes at least one of the following processes: (1) a process to allow only some of the transport vehicles to pass through the target route, (2) a process to evacuate the article located in a closed area, which is an area that is scheduled to be closed due to the shutting-down of the target route, to an effective area, which is an area that is not closed before or after the shutting-down of the target route, using the transport vehicle, or (3) (a process to permit a transport destined for the processing position in the closed area and prohibit a transport destined for the storage position in the closed area. The route shut down process is a process that is performed after the pre-processing and prohibits the transport vehicle from traveling the target route.

This allows the closure of the target route to be performed in stages. Thus, the processing load of the controller can be reduced or minimized.

In the transport system described above, it is preferable that the controller is configured or programmed to execute a process to allow only some of the transport vehicles to pass through the target route. When a detour route that avoids the target route exists, the controller is configured or programmed to cause the transport vehicle to travel to the destination on a route that does not pass through the target route. When a detour route that avoids the target route does not exists, the controller is configured or programmed to cause the transport vehicle to travel to the destination on a route that passes through the target route.

This reduces the frequency of the transport vehicle passing through the target route, while allowing the transport vehicle to pass through the target route when the passage through the target route is essential.

In the transport system described above, it is preferable that the pre-processing includes a process to evacuate the article located in the closed area to the effective area using the transport vehicle, and the controller is configured or programmed to evacuate all the articles from the closed area to the effective area after evacuation destinations have been secured for all the articles to be evacuated from the closed area to the effective area.

This allows evacuation of the articles after the evacuation destination has been set, thus the articles can be evacuated smoothly.

In the transport system, it is preferable that the article is a container that houses an object to be transported.

This prevents the containers from being left in the closed area, thereby preventing a decrease in transfer efficiency after the route shut down process.

The above and other elements, features, steps, characteristics and advantages of the present invention will become more apparent from the following detailed description of the example embodiments with reference to the attached drawings.

BRIEF DESCRIPTION OF THE DRAWINGS

FIG. 5 is a table showing the contents of a first pre-processing, second pre-processing, and route shut down process.

DETAILED DESCRIPTION OF THE EXAMPLE EMBODIMENTS

Next, example embodiments of the present invention are described with reference to the drawings.

Figure 1:
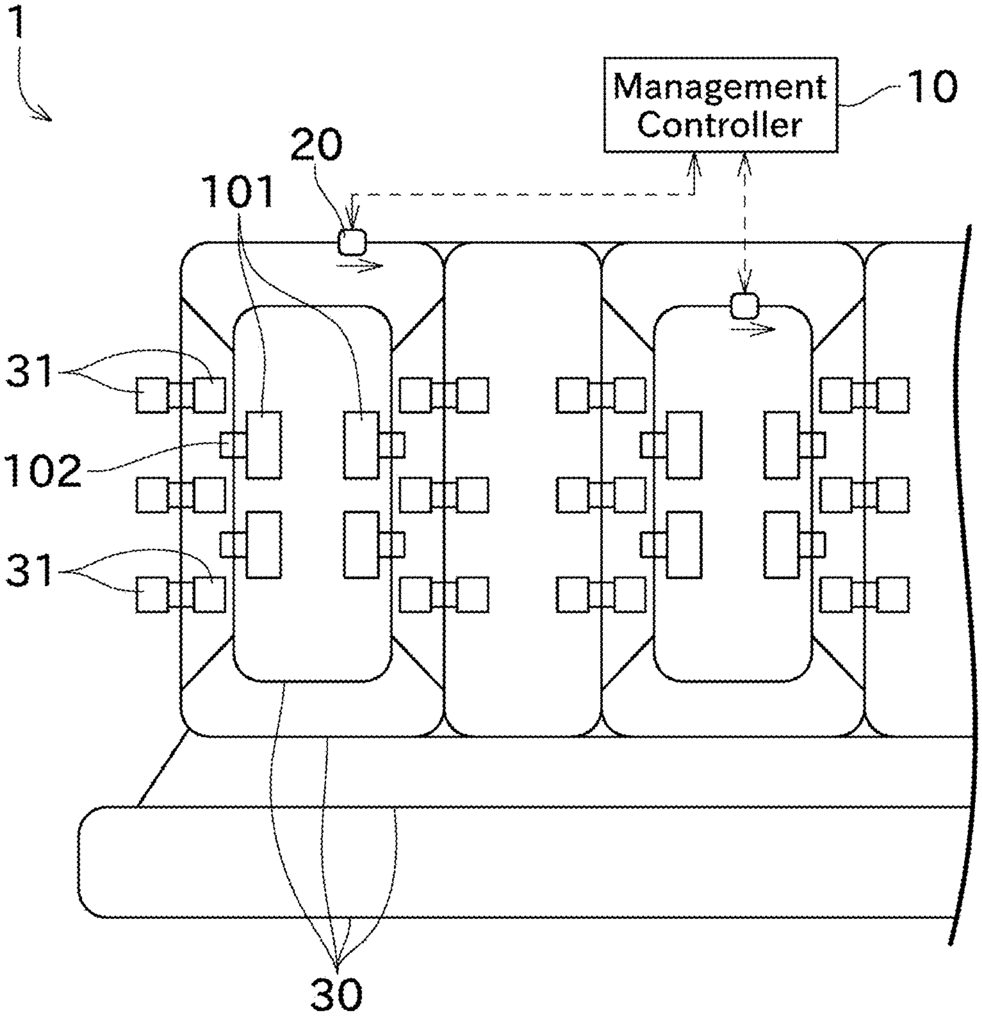
FIG. 1 is a schematic plan view of a transport system according to an example embodiment of the present invention.

The transport system 1 shown in FIG. 1 is installed in a facility such as a semiconductor manufacturing plant or a warehouse, and transports an article 50. The article 50 transported by the transport system 1 is a container that houses a wafer (semiconductor wafer). Specifically, the container is a FOUP (Front-Opening Unified Pod) or a wafer cassette. The article 50 may also be a reticle pod that houses a reticle. When the transport system 1 is installed in a warehouse, the articles 50 are commodities or parts stored in the warehouse.

Figure 2:
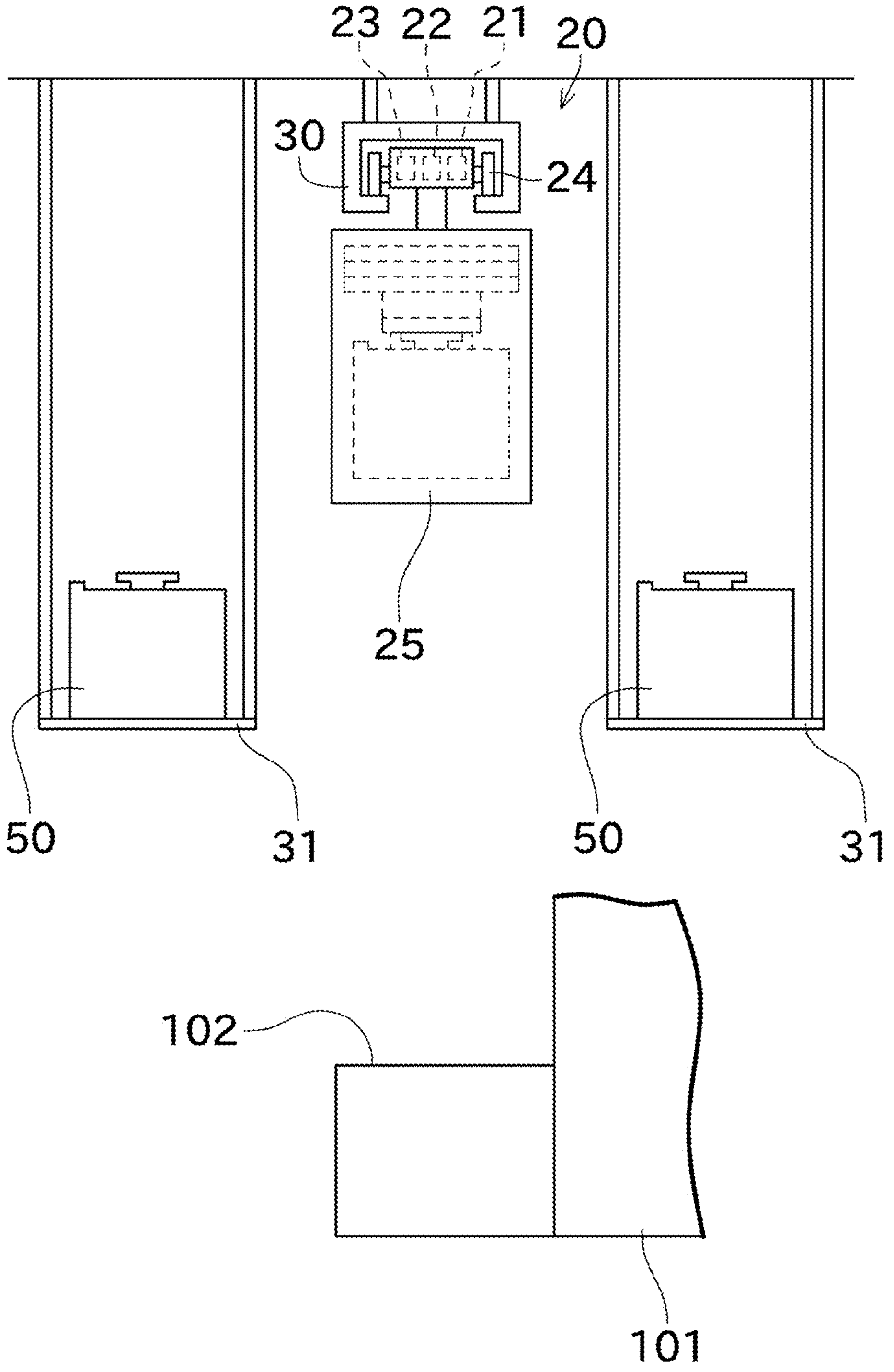
FIG. 2 is a front view of the transport system.

As shown in FIG. 1 and FIG. 2, the transport system 1 includes a management controller (controller) 10, a transport vehicle 20, and a track 30.

The management controller 10 may include a computer including an arithmetic processor such as a CPU and a storage such as an HDD, SSD, or flash memory. The management controller 10 is capable of executing various controls related to transport and processing of the article 50 by reading and executing programs stored in the storage. The management controller 10 is configured or programmed to generate a transport command based on information received from an upper-level controller and assign the transport command to the transport vehicle, thereby instructing the transport vehicle 20 to transport the article 50.

The transport vehicle 20 is an overhead hoist transfer (OHT).

The transport vehicle 20 is a vehicle that travels unmanned along the track 30 suspended from the ceiling to transport the article 50. As shown in FIG. 2, the transport vehicle 20 includes a communication apparatus 21, a drive controller 22, a motor 23, wheels 24, and a transport unit 25.

The communication 21 apparatus is a wireless communication module for wireless communication with the outside. The communication apparatus 21 can communicate with the management controller 10 that controls the transport system 1. The drive controller 22 may include a computer including an arithmetic processor such as a CPU and a storage such as a HDD, SSD, or flash memory. The drive controller 22 can be configured or programmed to perform various controls related to the transport vehicle 20 by reading and executing programs stored in the storage. The drive controller 22 is configured or programmed to operate the motor 23 based on the transport command received from the management controller 10, for example. The motor 23 generates a driving force to run the transport vehicle 20 using electric power supplied via the track 30. The driving force generated by the motor 23 is transmitted to the wheels 24 via a transmission mechanism. This causes the transport vehicle 20 to travel along the track 30. The transport unit 25 includes a hand that can switch between, for example, a state in which the hand holds the article 50 and a state in which the hand releases the holding of the article 50, allowing the article 50 to be received and delivered.

A semiconductor manufacturing plant is provided with a storage shelf 31 and a processor 101. The storage shelf 31 and the processor 101 are located near the track 30. The transport vehicle 20 can deliver the article 50 to the storage shelf 31 and the processor 101, and can receive the article 50 from the storage shelf 31 and the processor 101.

The storage shelf 31 is a portion where the article 50 is temporarily stored. The storage shelf 31 is located adjacent to the track 30 in plan view. The storage shelf 31 temporarily stores the article 50 waiting to be processed by the processor 101 or temporarily stores the article 50 to be transported to another point. A position at which the transport vehicle 20 delivers the article 50 to the storage shelf 31 is referred to as a storage position. A direction in which the transport vehicle travels along the track 30 is the front-back direction, and a direction orthogonal to the front-back direction in plan view is the left-right direction. The storage shelf 31 is located, for example, on the outer side of the track 30 in the left-right direction.

The processor 101 includes a load port (processing position) 102 at which the article 50 is received from the transport vehicle 20. The processor 101 incorporates the article 50 placed at the load port 102 by the transport vehicle 20 and performs processing (e.g., a process for manufacturing semiconductor devices) on the wafer housed in the article 50. The load port 102 is located overlapping the track 30 in plan view, but may be located in a different location.

A transfer auxiliary device may be provided adjacent to the processor 101. The auxiliary device temporarily stores the article 50 waiting to be processed by the processor 101. The transfer auxiliary device incorporates the article 50 received from the transport vehicle 20 and temporarily stores the article 50. Then, after the processor 101 is ready to perform processing, the transfer auxiliary device delivers the article 50 to the processor 101. The position at which the transport vehicle 20 delivers the article 50 to the transfer auxiliary device is a position at which the article 50 is delivered to the processor 101, which corresponds to the processing position.

Figure 3:
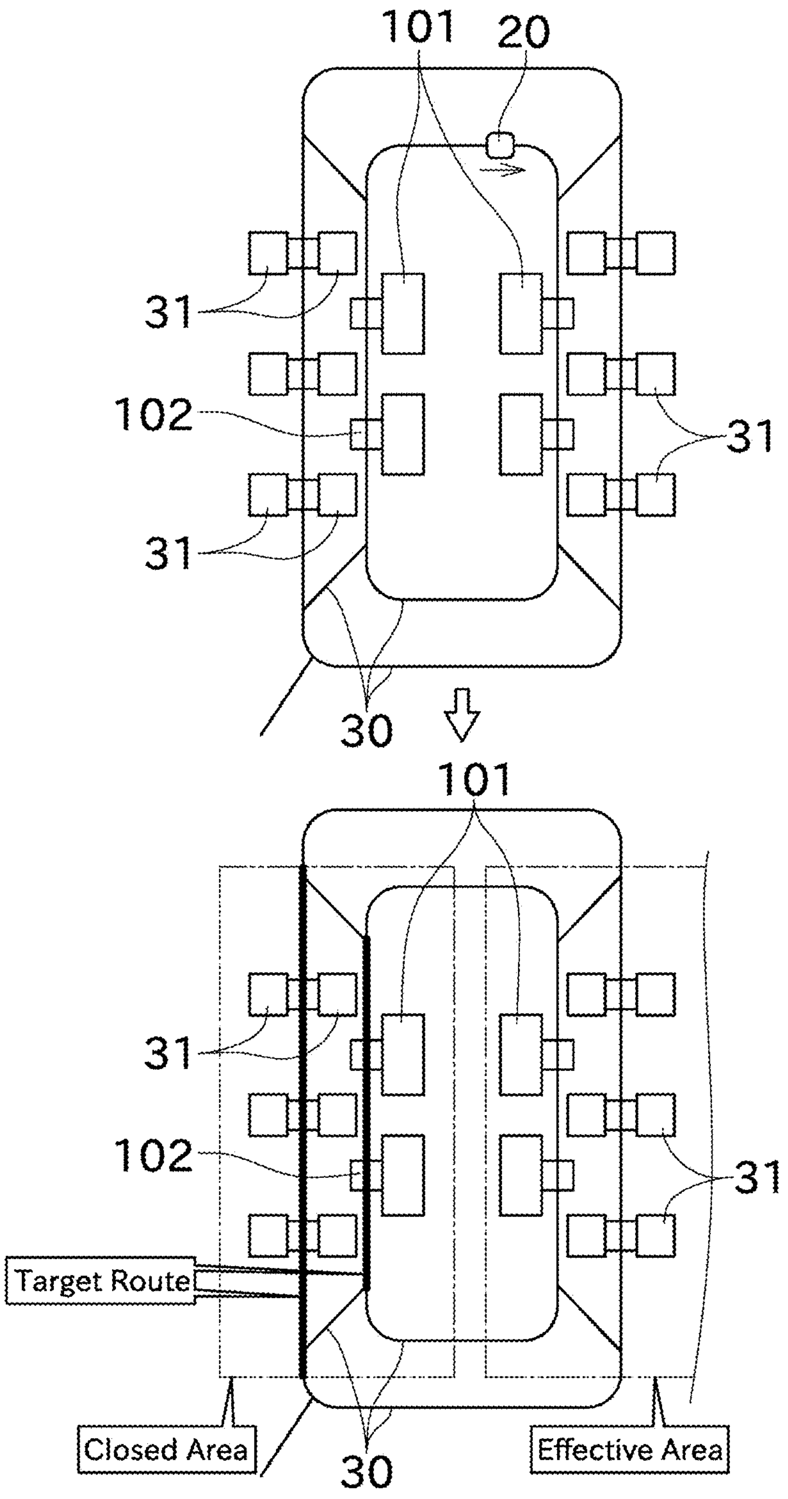
FIG. 3 is a schematic plan view of a closed area and an effective area after setting a target route.
Figure 4:
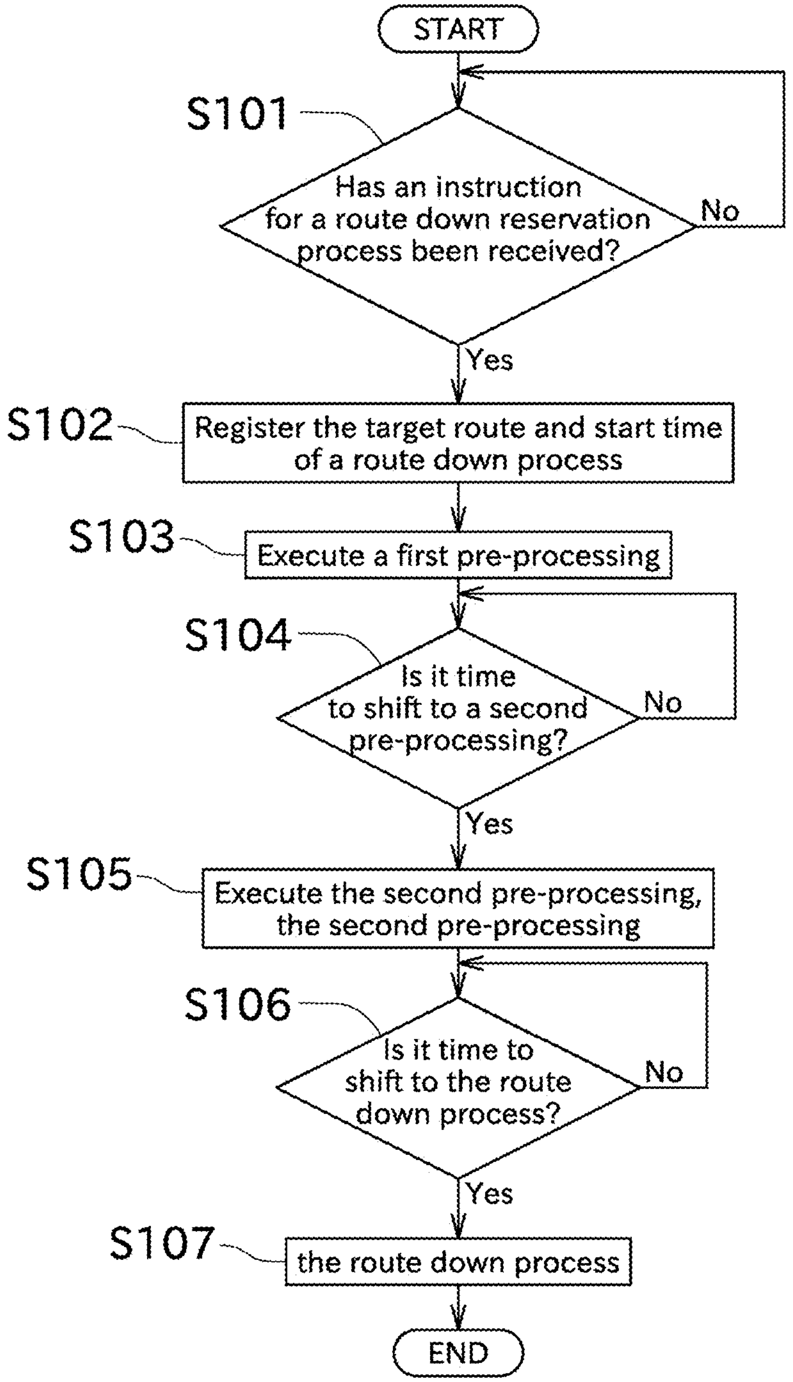
FIG. 4 is a flowchart showing a process from receipt of a route shut down reservation process instruction to execution of a route shut down process.

Next, a route shut down process is described with reference to FIG. 3-FIG. 5.

The route shut down process includes shutting down a portion of the track 30, for example, for maintenance purposes. Types of maintenance include, for example, maintenance of the track 30 and maintenance related to the power feed through the track 30. Alternatively, when communication or control between the management controller 10 and the transport vehicle 20 is temporarily suspended, the track 30 included in the area where communication or control is suspended is shut down. The transport vehicle 20 cannot travel on the shut-down route. In detail, the management controller 10 sets a destination and a route of the transport vehicle 20 so that the transport vehicle 20 does not travel the shut-down route. Hereinafter, the route to be shut-down is referred to as a "target route."

Next, a closed area and an effective areas will be described. In the transport system 1, an area scheduled to be closed (closed area) may occur as a result of the execution of the route shut down process. When an area is closed, the transport vehicle 20 cannot travel from the closed area to the outside of the closed area, and the transport vehicle 20 cannot travel from the outside of the closed area to the closed area. For example, as shown in FIG. 3, when there are two target routes, the closed area is an area surrounded by the two target routes. On the other hand, an area that is effective both before and after the execution of the route shut down process (an area that is not closed) is referred to as the effective area.

If the management controller 10 immediately executes the route shut down process after receiving an instruction to shut down a path of a route, it will be necessary to change the destinations or routes of all the transport vehicles 20 affected by the route shut down process. Therefore, the processing load of the management controller 10 during execution of the route shut down process becomes high, and as a result, other controls performed by the management controller 10 may be delayed. Furthermore, the article 50 that is in the closed area at the time of execution of the route shut down process cannot be used after execution of the route shut down process. As a result, wafer transfer efficiency may decrease.

In this regard, the management controller 10 of the present example embodiment executes a pre-processing before executing the route shut down process. This allows the processing load of the management controller 10 to be distributed. As a result, delays in other controls performed by the management controller 10 can be reduced. The pre-processing is described in detail below.

When the route shut down processing becomes necessary, the administrator operates his/her own terminal or PC, etc. to set the target route and start time. This sends an instruction to the management controller 10 for the route shut down reservation process. The administrator may also directly operate the management controller 10 to instruct the route shut down reservation process. Alternatively, the route shut down reservation process may be directed to the management controller 10 according to a pre-created schedule.

The management controller 10 determines whether the instruction for the route shut down reservation process has been received (S101). If the management controller 10 receives the instruction for route shut down reservation process, the management controller 10 registers the target route and start time of the route shut down process (S102).

Next, the management controller 10 executes a first pre-processing (S103). In the present example embodiment, the pre-processing is divided into two stages: the first pre-processing and a second pre-processing. As shown in FIG. 5, the first pre-processing includes "(1) route handling", "(2) evacuation of the article", and "(3) transport command handling". The order in which "(1) route handling", "(2) evacuation of the article", and "(3) transport command handling" in the first pre-processing are performed is not limited, and at least two of these processes may be performed simultaneously.

"(1) route handling" process is used to progressively prohibit the transport vehicle 20 from traveling the target route. This reduced frequency reduces the number of the transport vehicles 20 that are affected when the route shut down processing is performed, thus reducing or minimizing the processing load of the management controller 10.

"(1) route handling" in the first pre-processing, the cost of passing through the target route is increased. The cost is a parameter commonly used when a route search is performed. The management controller 10 searches for a route that minimizes the cost from a starting point to the destination and sets that route for the transport vehicle 20. As a general rule, the cost increases as the travel distance increases. In addition, the cost of passing through a location where it is undesirable to pass through is set to a larger value than the cost of passing through other locations. Thus, the cost of passing through the target route can be set to be significantly greater than the cost of passing through other routes, thereby reducing the frequency at which the transport vehicle 20 passes through the target route.

Specifically, when a detour route that avoids the target route exists, the transport vehicle 20 will be assigned a route to travel on the detour route. On the other hand, when a detour route does not exist, the transport vehicle 20 will be assigned to travel to the destination via the target route. The management controller 10 also makes a list of the transport vehicles 20 that travel from the effective area to the closed area via the target route as a monitoring object. This list is used in the second pre-processing.

The process of increasing the cost of passing through the target route in "(1) route handling" is an example and can be replaced by other processes that allow only some of the transport vehicles 20 to pass through the target route. For example, the process in which passage of the target route by the transport vehicle 20 whose destination is a point within the closed area is permitted, while passage of the target route by the transport vehicle 20 whose destination is a point outside the closed area is prohibited, may be performed.

"(2) Evacuation of the article" is the process of evacuating the article located in the closed area to the effective area. If the route shut down process is executed with the articles 50 located in the closed area, the number of usable articles 50 is reduced, and the wafer transfer efficiency is reduced. Furthermore, it may be necessary to register that the articles 50 is no longer usable or the like, in which case the processing load of the management controller 10 is higher. Then, when these articles 50 are carried by workers to the effective area, labor is required. In this regard, as the transport vehicle 20 moves the article 50 to the effective area before the route shut down process is executed, the number of usable articles 50 after the route shut down process is not reduced. Thus, wafer transfer efficiency is maintained. In addition, the processing load of the management controller 10 during the route shut down process can be reduced or minimized. In addition, this reduces labor compared to the method of manually transporting the articles 50.

In "(2) evacuation of the article" in the first pre-processing, the article 50 located in the closed area is initially identified. The management controller 10 controls the transport of the article 50 using the transport vehicle 20 based on the position of the transport vehicle 20 and the position of the article 50. Therefore, the management controller 10 can identify the article 50 located in the closed area based on the information used in this control. Next, the management controller 10 secures the same number of evacuation points as the number of the articles 50 which are identified. The evacuation points are the storage shelves 31 in the effective area, where no other articles 50 are located and where no other articles 50 are destined. When an evacuation point of this type exists, the management controller 10 secures the evacuation point by blocking this point. Blocking means that the transport vehicle 20 is set to not place other articles 50.

"(3) Transport command handling" is the process of progressively reducing the number of transport commands whose starting point or destination is the closed area. This reduces the number of transport vehicles 20 that are affected when the route shut down process is executed, thereby reducing the processing load of the management controller 10.

"(3) Transport command handling" in the first pre-processing, all transport commands are permitted. In other words, the conditions for transport commands are the same before and after the first preprocessing. Therefore, based on the information received from the upper-level controller, the management controller 10 can generate a transport command for any position as the starting point or destination and assign that command to the transport vehicle 20.

After the management controller 10 starts executing the first pre-processing, the management controller 10 determines whether or not it is time to shift to the second pre-processing (S104). For example, the management controller 10 determines that it is time to shift to the second pre-processing when it reaches a predetermined time before the start time of the route shut down process. Alternatively, the condition to shift to the second pre-processing may be that the evacuation points for all the articles 50 have been secured in the first pre-processing.

When the management controller 10 determines that it is time to shift to the second pre-processing, the second pre-processing is performed (S105). The second pre-processing includes "(1) route handling", "(2) evacuation of the article", and "(3) transport command handling". The order in which the above "(1) route handling", "(2) evacuation of the article", and "(3) transport command handling" in the second pre-processing are performed is not limited. However, it is preferable to perform "(2) evacuation of the article" prior to "(3) transport command handling". Also, at least two processes may be performed simultaneously.

In "(1) route handling" in the second pre-processing, travel on the target route by the transport vehicle 20 is prohibited in principle. Travel on the target route by the transport vehicle 20 is permitted only for the transport vehicles 20 listed in the list created in the first pre-processing. The transport vehicles 20 on the list are located in the closed area and cannot operate after the route shut down process is executed. Therefore, the transport vehicle 20 is allowed to move from the closed position to the effective position.

When "(1) route handling" and "(2) evacuation of the article" in the second pre-processing are performed in parallel, the travel on the target route by the transport vehicle 20 to perform "(2) evacuation of the article" is permitted. When "(1) route handling" and "(3) transport command handling" are performed in parallel, travel on the target route by the transport vehicle 20 to perform "(3) transport command handling" is permitted. However, "(1) route handling" may be executed after the execution of "(2) evacuation of the article" and "(3) transport command handling" are completed.

The management controller 10 is configured or programmed to execute the process of prohibiting travel on the target route.

Then, when the above permitted situation occurs, the management controller 10 temporarily permits travel on the target route by executing the cancellation or abort process.

In "(2) evacuation of the article" in the second pre-processing, the evacuation of the article 50 for which the evacuation point has been secured in the first pre-processing is executed. In other words, in the present example embodiment, evacuation of the articles 50 starts after the evacuation points are secured for all articles 50 to be evacuated in the second pre-processing. Specifically, the management controller 10 instructs the transport vehicle 20 to retrieve the articles 50 located in the closed area and transport the articles 50 to the evacuation points secured in the first pre-processing. After the evacuation of all the articles 50 in the closed area is completed, the management controller 10 notifies the upper-level controller to that completion.

In "(3) transport command handling" in the second pre-processing, a transport command whose destination is the storage position in the closed area is not permitted. Specifically, the management controller 10 will shut down or block the point (port) corresponding to the storage position in the closed area so that the storage position in the closed area will not be the destination. Further, a transport command whose destination is the processing position in the closed area is permitted. This is because the purpose of a semiconductor plant is for the processor 101 to perform processing on wafers, and therefore the transport of the articles 50 to the processing position has a high priority. In "(2) evacuation of the article" in the second pre-processing, transport whose destination is the storage position is performed in order to retrieve the article 50 in the closed area. Therefore, in the second pre-processing, it is preferable to perform "(2) evacuation of the articles" prior to "(3) transport command handling".

After the management controller 10 starts executing the second pre-processing, the management controller 10 determines whether or not it is time to shift to the route shut down process (S106). For example, the management controller 10 determines that it is time to shift to the route shut down process when it reaches time to start the route shut down process. If the start time of the route shut down process is not set, the condition to shift to the route shut down process may be that the evacuation of all the articles 50 has been completed in the second pre-processing.

If the management controller 10 determines that it is time to shift to the route shut down process, the route shut down process is executed (S107). In the route shut down process, travel on the target route is prohibited without exception. Furthermore, all the transport whose starting point or destination is the closed position are not permitted. Specifically, the management controller 10 shuts down or blocks all points (ports) located in the closed area so that the closed area does not become the starting point and the destination of the transport vehicles 20. Thus, the route shut down process is completed. The route shut down process continues until another command is received to release the shut-down of the target route.

As described above, the transport system 1 of the present example embodiment includes a transport vehicle 20 and a management controller 10. The transport vehicle 20 transports the article 50 by traveling along the track 30. The management controller 10 is configured or programmed to control the transport vehicle 20. The destination of the transport vehicle 20 includes the processing position, which is a position for delivering the article 50 to a processor, and the storage position, which is a position for delivering the article 50 to the storage shelf 31 for temporarily storage of the article 50. The management controller 10 is configured or programmed to execute the pre-processing and the route shut down processing when shutting down the target route, which is a route selected from a plurality of routes on the track. The pre-processing includes at least one of the following three processes: (1) to allow only some of the transport vehicles 20 to pass through the target route, (2) to evacuate the article 50 located in the closed area, which is the area scheduled to be closed due to the shutting-down of the target route, to the effective area, which is the area that is not closed before or after the shutting-down of the target route, using the transport vehicles 20, or (3) to permit the transport whose destination is the processing position in the closed area and prohibit the transport whose destination is the storage position in the closed area. The route shut down process is a process performed after the pre-processing and prohibits the transport vehicles 20 from traveling on the target route.

This allows the closure of the target route to be performed in stages. Thus, the processing load of the management controller 10 can be reduced or prevented.

In the present example embodiment of the transport system 1, the management controller 10 executes a processing to allow only some of the transport vehicles 20 to pass through the target route. When the detour that avoids the target route exists, the management controller 10 causes the transport vehicle 20 to travel to the destination on the route that does not pass through the target route. When the detour route avoids the target route does not exist, the management controller 10 causes the transport vehicle 20 to travel to the destination on the route that passes through the target route.

This reduces the frequency of the transport vehicle 20 passing through the target route, while allowing the transport vehicle 20 to pass through the target route when the passage through the target route is essential.

In the present example embodiment of transport system 1, the pre-processing includes the process that evacuates the article 50 located in the closed area to the effective area using the transport vehicle 20, and after the evacuation points have been secured for all the articles 50 to be evacuated from the closed area to the effective area, all the articles 50 are evacuated from the closed area to the effective area.

This allows the evacuation of the articles 50 after the evacuation point has been set, thus the articles 50 can be evacuated smoothly.

In the present example embodiment of the transport system 1, the article 50 is a container (FOUP) that houses a wafer, which is an object to be transported.

This prevents the containers from being left in the closed area, thereby preventing a decrease in transfer efficiency after the route shut down process.

While example embodiments of the present invention have been described above, the above configuration can be modified, for example, as follows.

The flowchart shown in the above example embodiments is an example, and some processes may be omitted, the contents of some processes may be changed, or new processes may be added. For example, the pre-processing may be treated as a single process without dividing it into first and second pre-processing. In this case, the "(1) route handling" process is either to increase the cost of passing through the target route or to prohibit travel on the target route in principle. As for "(2) evacuation of article", the process is to relocate the transport vehicles 20 each time the evacuation point can be secured.

The management controller 10 may perform only one of the following processes: "(1) route handling", "(2) evacuation of the article", and "(3) transport command handling" as a pre-processing. Even in this case, the processing load of the management controller 10 can be reduced or prevented compared to the case where the route shut down process is immediately performed.

In "(1) route handling" in the first pre-processing of the above example embodiments, the cost of passing through the target route is increased. Instead of this, another setting of the route search may be changed. For example, it may be set so that the route search is performed with the target route as non-drivable, and if a route exists that reaches the destination from the starting point, that route is set, and if no route exists that reaches the destination from the starting point, the route search is performed again with the target route as drivable. Even with this setting, the frequency at which the transport vehicle 20 travels the target route can be reduced.

In the above example embodiments, an OHT is used as an example of the transport vehicles 20, but the present invention can also be applied to another vehicle, such as an AGV (Automated Guided Vehicle) or a suspension crane.

While example embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A transport system comprising:

a transport vehicle to transport an article by traveling along a track; and a controller configured or programmed to control the transport vehicle; wherein a destination of the transport vehicle includes a processing position, which is a position for delivering the article to a processor, and a storage position, which is a position for delivering the article to a storage shelf for temporary storage of the article; and the controller is configured or programmed to executes:

when shutting down a target route, which is a route selected from a plurality of routes on the track, a pre-processing including at least one of the following processes:

(1) to evacuate the article located in a closed area, which is an area that is scheduled to be closed due to the shutting-down of the target route, to an effective area, which is an area that is not closed before or after the shutting-down of the target route, using the transport vehicle, or (2) to permit the transport destined for the processing position in the closed area to prohibit the transport destined for the storage position in the closed area; and a route shut down processing, which is a process performed after the pre-processing to prohibit the transport vehicle from traveling on the target route.

2. A transport system comprising:

a transport vehicle to transport an article by traveling along a track; and a controller configured or programmed to control the transport vehicle; wherein a destination of the transport vehicle includes a processing position, which is a position for delivering the article to a processor, and a storage position, which is a position for delivering the article to a storage shelf for temporary storage of the article; and the controller is configured or programmed to execute:

when shutting down a target route, which is a route selected from a plurality of routes on the track, a pre-processing including at least one of the following processes:

(1) to allow only some of the transport vehicles to pass through the target route, (2) to evacuate the article located in a closed area, which is an area that is scheduled to be closed due to the shutting-down of the target route, to an effective area, which is an area that is not closed before or after the shutting-down of the target route, using the transport vehicle, or (3) to permit the transport destined for the processing position in the closed area to prohibit the transport destined for the storage position in the closed area; and a route shut down processing, which is a process performed after the pre-processing to prohibit the transport vehicle from traveling on the target route;

in the pre-processing, by executing a processing that allows only some of the transport vehicles to pass through the target route:

when a detour route that avoids the target route exists, the controller is configured or programmed to cause the transport vehicle to travel to the destination on a route that does not pass through the target route; and when a detour route that avoids the target route does not exist, the controller is configured or programmed to cause the transport vehicle to travel to the destination on a route that passes through the target route.

3. A transport system comprising:

a transport vehicle to transport an article by traveling along a track; and a controller configured or programmed to control the transport vehicle; wherein a destination of the transport vehicle includes a processing position, which is a position for delivering the article to a processor, and a storage position, which is a position for delivering the article to a storage shelf for temporary storage of the article; and the controller is configured or programmed to execute:

when shutting down a target route, which is a route selected from a plurality of routes on the track, a pre-processing including at least one of the following processes:

(1) to allow only some of the transport vehicles to pass through the target route, (2) to evacuate the article located in a closed area, which is an area that is scheduled to be closed due to the shutting-down of the target route, to an effective area, which is an area that is not closed before or after the shutting-down of the target route, using the transport vehicle, or (3) to permit the transport destined for the processing position in the closed area to prohibit the transport destined for the storage position in the closed area;

a route shut down processing, which is a process performed after the pre-processing to prohibit the transport vehicle from traveling on the target route;

the pre-processing includes a process to evacuate the article located in the closed area to the effective area using the transport vehicle; and the controller is configured or programmed to evacuate all the articles from the closed area to the effective area after evacuation destinations have been secured for all the articles to be evacuated from the closed area to the effective area.

4. A transport system according to claim 3, wherein the article is a container that houses an object to be transported.

* * * * *